Figure 1:
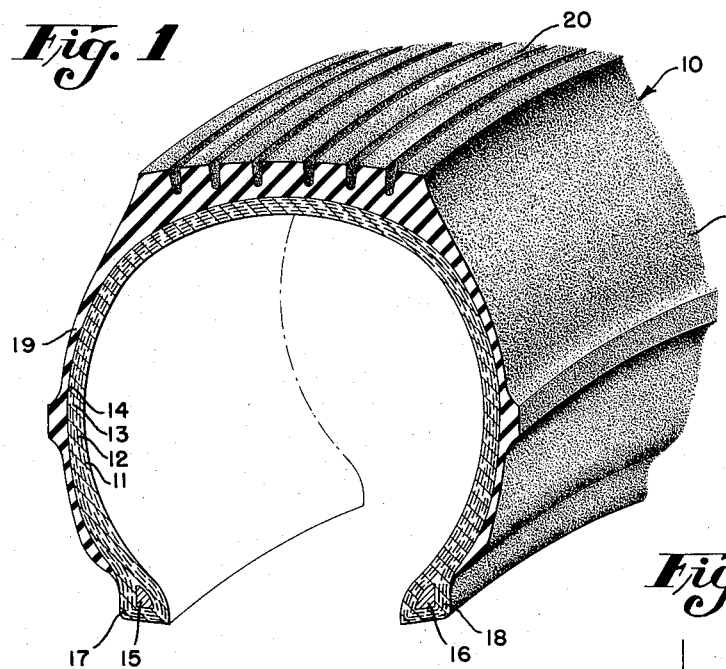

INVENTOR.
ARTHUR W. BULL
BY Charles A. Blank
ATTORNEY.

United States Patent Office 2,968,331
Patented Jan. 17, 1961

2,968,331
TIRE CONSTRUCTION

Arthur W. Bull, Grosse Pointe, Mich., assignor to United States Rubber Company, New York, N.Y., a corporation of New Jersey Filed Nov. 4, 1959, Ser. No. 850,876

4 Claims. (Cl. 152—356)

This invention relates to improvements in pneumatic tires and particularly to a new and novel ply arrangement providing improved ride characteristics.

In the present conventional method of manufacturing tires, the plies are formed of essentially weftless fabric comprising parallel cords bonded together with skim coatings of rubber. The plies are superposed upon one another, and are usually so disposed that the cords of each ply extend at opposite angles to the cords of adjacent plies.

With such a ply arrangement, a 4-ply tire, for instance, will have four building splices; i.e., the splices between the ends of each of the four plies when the plies are applied to the building drum, and from two to four roll-up splices; i.e., the splices between the ends of the lengths of fabric on the servicer or supply roll. This unavoidable multiplicity of splices produces tire nonuniformities which cause thump, roughness and vibrations in the tire.

More recently, in an effort to reduce the number of splices, tires have been constructed having a ply arrangement consisting of two pairs of parallel plies, in which the cords of the first and second plies are parallel and the cords of the third and fourth plies are parallel, but extend in the opposite direction to the cords of the first and second plies. In building tires with this ply arrangement, each pair of parallel plies is formed from an essentially continuous length of fabric as it comes from the servicer, so that two of the building splices are eliminated.

While tires of this latter construction improved tire uniformity and thus reduced thump, roughness and vibrations, they were found to be less stable in their steering behavior than the conventional tires in which the cords of all adjacent plies extend in opposite directions.

A careful study of this effect was made, and it was determined that some of the stability characteristics of tires result from the shearing action due to a shift in angle at the ply interfaces as the cords pass through the deflection area adjacent the road surface.

In the conventionally built tire, in which the cords of all adjacent plies extend in opposite directions, this change in angular placement occurs at three places; i.e., at the interfaces of the first and second plies, the second and third plies, and the third and fourth plies. In a tire constructed with two pairs of parallel plies, this change in angular placement occurs only at one place; i.e., at the interface of the second and third plies where the cords extend in opposite directions.

An object of this invention is to provide a tire having a novel ply arrangement with improved tire uniformity and stability.

Another object of the invention is to provide a 4-ply tire having a ply arrangement in which the plies are so disposed that the cords of adjacent plies extend in opposite directions at two interfaces of the plies and parallel at another interface of the plies.

In accordance with this invention, in a 4-ply tire, the cords of the first and fourth plies extend at an angle to the crown center line of the tire in the same direction and the cords of the second and third plies are parallel and extend in an opposite direction.

With such a ply arrangement, the splice between the second and third plies may be eliminated and tire uniformity improved. Also, the cords at the interfaces of the first and second plies and at the interfaces of the third and fourth plies extend in opposite directions so that the stability of the tire is not impaired for the reasons pointed out above.

Figure 3:
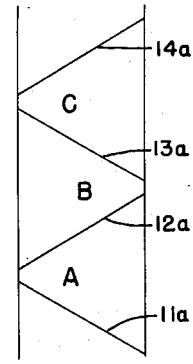
Figure 2:
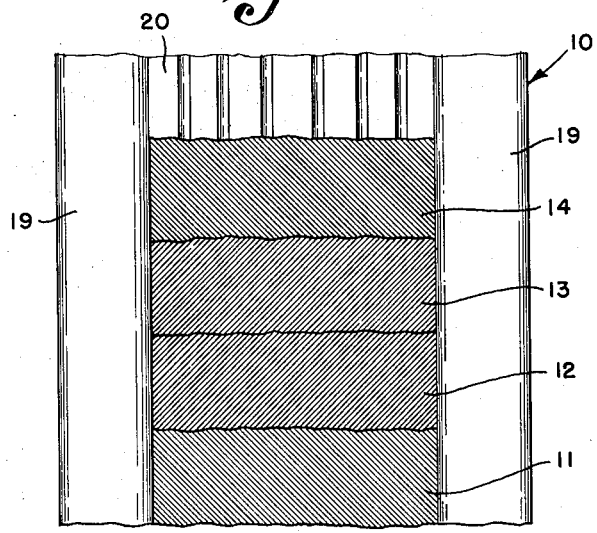
Figure 4:
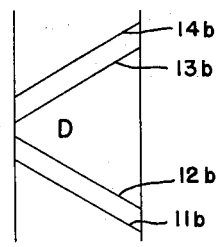
Figure 5:
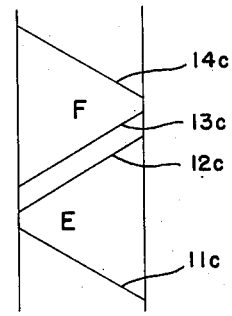

Other objects, advantages, and the novel details of construction of the invention will be made more apparent as this description proceeds, especially when considered in connection with the accompanying drawings, in which, Fig. 1 is a sectional perspective view of a 4-ply pneumatic tire constructed in accordance with this invention, Fig. 2 is a fragmentary plan view of the tire of Fig. 1, with parts broken away, Fig. 3 is a diagrammatic view showing the ply arrangement of a conventional 4-ply tire, Fig. 4 is a diagrammatic view showing the ply arrangement of a 4-ply parallel ply tire in which two pairs of plies have their cords extending in opposite directions, and Fig. 5 is a diagrammatic view showing a 4-ply tire having a ply arrangement in accordance with this invention.

Referring now to the drawings, the invention is described, by way of example, in connection with an otherwise conventional 4-ply pneumatic passenger tire indicated generally at 10 in Figs. 1 and 2. The tire, as shown, comprises a body of four plies 11, 12, 13 and 14 of rubberized fabric, ply 11 being the first or band ply, plies 12 and 13 the intermediate plies, and ply 14 the outer ply. As in conventional tire building, the plies are formed of essentially weftless fabric comprising parallel cords bonded together with skim coatings of rubber or rubber-like material. The edges of the plies are wrapped around and anchored to the bead wire bundles 15 and 16 which form the inextensible portions of the tire beads 17 and 18. The tire is completed by sidewalls 19 and a tread 20. In constructing the body of the tire, the plies are superposed upon one another and are usually so disposed that the cords of at least some of the plies extend at an angle to the cords of one or more adjacent plies.

In building the present tire, the plies 11, 12, 13 and 14 are applied to the building drum (not shown) so that the cords extend at angles of from 54° to 62°. In the shaped and finished tire, the cord angles are preferably between 34° and 41°. The aforesaid angles are the lesser angles between the cords and the crown center line of the tire.

In manufacturing conventional type tires, the plies are arranged as shown diagrammatically in Fig. 3, wherein the reference character 11a indicates the first or band ply; 12a and 13a the intermediate plies; and 14a the fourth or outer ply. As will be noted, the plies are so disposed that the cords of each ply extend at opposite angles to the cords of adjacent plies. While in this diagrammatic view the cords of plies 11a and 13a are shown as disposed at an angle to the left, and the cords of plies 12a and 14a are disposed at an angle to the right, these angles, as will be understood, are sometimes reversed.

The conventional 4-play tire diagrammatically illustrated in Fig. 3 requires four building splices; i.e., a splice for uniting the ends of each of the plies 11a, 12a, 13a and 14a. Also, a 4-ply tire of this conventional construction may have from two to four roll-up splices, which are the splices between the ends of the lengths of fabric on the servicer or supply roll. The number of splices required in conventional tires of this type produces tire nonuniformity, which causes thump, roughness and vibrations in the tire.

In order to reduce the number of necessary splices and improve tire uniformity, the ply arrangement illustrated diagrammatically in Fig. 4 has been resorted to. In this type of construction, the first two plies 11b and 12b are parallel and extend in one direction, and plies 13b and 14b are parallel and extend in the opposite direction. In building tires with this ply arrangement, each pair of parallel plies is formed from an essentially continuous length of fabric as it comes from the servicer or supply roll, so that two of the building splices are eliminated.

While the construction illustrated in Fig. 4 improves tire uniformity, tires constructed in this manner have been found to be less stable in their steering behavior than tires of the conventional construction illustrated in Fig. 3. The reason for this, as heretofore pointed out, is that some of the stability characteristics of tires result from the shearing action due to a shift in the cord angles as the cords pass through the deflection area adjacent the road surface as the tire rolls along the road. In the conventional tire illustrated in Fig. 3, in which the cords of all adjacent plies extend in opposite directions, the change in angular placement occurs at three places; that is, at the interfaces A, B and C of the first and second plies, the second and third plies, and the third and fourth plies, respectively. At each of these interfaces the cords of the adjacent plies have opposite angles. In Fig. 4 this change in angular placement occurs only at the interface D between the second and third plies, where the cords of adjacent plies extend in opposite directions.

Thus, while the ply arrangement illustrated in Fig. 4 improves tire uniformity, this construction is less stable in its steering behavior, and is thus unsatisfactory.

In accordance with the present invention, as shown in Fig. 2 and diagrammatically in Fig. 5, the cords of the first and fourth plies 11c and 14c are parallel and the cords of the second and third plies 12c and 13c are parallel and extend in an opposite direction from the first and fourth plies. The parallel plies 12c and 13c are preferably formed from an essentially continuous length of fabric which is wrapped twice around the building drum, thus shortening the building time. With this ply arrangement, the splice between the second ply 12c and the third ply 13c is eliminated and tire uniformity is improved. Also, the cords at the interfaces E and F of the first and second plies and of the third and fourth plies, respectively, extend in opposite directions so that the stability of the tire remains unimpaired for the reasons pointed out heretofore.

While in Figs. 2 and 5 the first and fourth plies are shown as laid left and the second and third plies are shown as laid right, this disposition of the plies may be reversed so that the first and fourth plies would be laid right and the second and third plies laid left, as will be understood by those skilled in the art.

Experiments have shown that tires having a ply arrangement in accordance with the invention are remarkably free from thump, roughness and vibrations produced by tire nonuniformity; are stable in their steering behavior; and otherwise provide improved ride characteristics.

Having thus described my invention, what I claim and desire to protect by Letters Patent is:

1. A pneumatic tire having a body consisting of four plies of essentially weftless cord fabric, the cords of the first and fourth plies being disposed substantially parallel to one another, and the cords of the second and third plies being disposed substantially parallel to one another and extending in a direction opposite to that of the first and fourth plies, whereby the cords of adjacent plies extend in opposite directions at two interfaces of the plies and parallel at another interface of the plies.

2. A four-ply pneumatic tire having a body comprising plies of essentially weftless cord fabric, the cords of the first and fourth plies being substantially parallel and disposed at an angle to the crown center line of the tire, the cords of the second and third plies being substantially parallel and disposed at an angle opposite to that of the first and fourth plies, whereby the cords at the interfaces of the first and second plies and of the third and fourth plies extend in opposite directions, and the cords at the interface of the second and third plies are parallel.

3. A four-ply pneumatic tire having a body comprising four plies of cord fabric, the cords of the first and fourth plies being substantially parallel and disposed at an angle to the crown center line of the tire, the second and third plies being formed of an essentially continuous length of fabric with the cords thereof substantially parallel and disposed at an angle opposite to that of the first and fourth plies.

4. A four-ply pneumatic tire having a body comprising four plies of cord fabric, the cords of the first and fourth plies extending in the same direction at an angle to the crown center line of the tire, the second and third plies being formed of an essentially continuous length of fabric to eliminate a splice and having the cords disposed at an angle opposite to that of the first and fourth plies, whereby the cords at the interfaces of the first and second plies and of the third and fourth plies extend in opposite directions.

References Cited in the file of this patent

UNITED STATES PATENTS

| | | |
|---|---|---|
| 2,225,042 | Elliott | Dec. 17, 1940 |
| 2,317,912 | Howe | Apr. 27, 1943 |
| 2,537,632 | Mansfield et al. | Jan. 9, 1951 |

FOREIGN PATENTS

| | | |
|---|---|---|
| 382,823 | France | Dec. 18, 1907 |
| 187,149 | Great Britain | Oct. 19, 1922 |